US012674085B2

(12) United States Patent
Furukawa

(10) Patent No.: US 12,674,085 B2
(45) Date of Patent: Jul. 7, 2026

(54) CURABLE RESIN COMPOSITION, A CURED PRODUCT, A LAMINATED BODY COMPOSED OF A CURED PRODUCT, AND A METHOD FOR DISASSEMBLING THEREOF

(71) Applicant: THREEBOND CO., LTD., Hachioji (JP)

(72) Inventor: Masazumi Furukawa, Hachioji (JP)

(73) Assignee: ThreeBond Co., Ltd., Hachioji (JP)

( * ) Notice: Subject to any disclaimer, the term of this patent is extended or adjusted under 35 U.S.C. 154(b) by 99 days.

(21) Appl. No.: 18/389,019

(22) Filed: Nov. 13, 2023

(65) Prior Publication Data

US 2024/0191110 A1     Jun. 13, 2024

(30) Foreign Application Priority Data

Dec. 7, 2022     (JP) ................................. 2022-195315

(51) Int. Cl.
| | |
|---|---|
| *C09J 135/02* | (2006.01) |
| *B32B 7/12* | (2006.01) |
| *C08F 22/10* | (2006.01) |
| *C09J 5/00* | (2006.01) |

(52) U.S. Cl.
CPC .............. *C09J 135/02* (2013.01); *B32B 7/12* (2013.01); *C08F 22/1006* (2020.02); *C09J 5/00* (2013.01); *B32B 2255/26* (2013.01); *B32B 2255/28* (2013.01); *C09J 2301/502* (2020.08); *C09J 2433/00* (2013.01)

(58) Field of Classification Search
CPC ......... C08K 5/25; C09J 4/00; C08F 22/1006; C08F 222/102; C08F 222/103
See application file for complete search history.

(56) References Cited

U.S. PATENT DOCUMENTS

| | | | | |
|---|---|---|---|---|
| 4,061,845 | A | * | 12/1977 | Fabris .................... C08G 73/08 |
| | | | | 528/367 |
| 4,101,602 | A | | 7/1978 | Fabris et al. |

| | | | | |
|---|---|---|---|---|
| 5,663,241 | A | | 9/1997 | Takamatsu et al. |
| 2007/0093575 | A1 | | 4/2007 | Murakami et al. |
| 2009/0000736 | A1 | | 1/2009 | Mitarai |
| 2010/0273924 | A1 | * | 10/2010 | Burckhardt ........ C08G 18/4812 |
| | | | | 524/189 |
| 2012/0205043 | A1 | | 8/2012 | Kurimura et al. |
| 2015/0080839 | A1 | * | 3/2015 | Trapp .................... A61F 13/536 |
| | | | | 604/385.101 |
| 2022/0056243 | A1 | * | 2/2022 | Okahisa .................. C08L 7/00 |

FOREIGN PATENT DOCUMENTS

| | | | | | |
|---|---|---|---|---|---|
| CN | 104592929 | A | * | 5/2015 | |
| JP | S53056614 | A | | 5/1978 | |
| JP | H10204327 | A | | 8/1998 | |
| JP | H11080665 | A | | 3/1999 | |
| JP | 2005002147 | A | | 1/2005 | |
| JP | 2010285370 | A | | 12/2010 | |
| JP | 2012-007036 | A | | 1/2012 | |
| JP | 7074033 | B2 | | 5/2022 | |
| WO | 2007/083566 | A1 | | 7/2007 | |
| WO | 2017216108 | A1 | | 12/2017 | |
| WO | WO-2021153242 | A1 | * | 8/2021 | ............... C08K 5/25 |

OTHER PUBLICATIONS

European Patent Office, "Extended European Search Report for European Patent Application No. 23209569.5", May 8, 2024, 7pp.
Japan Patent Office, Notice of Reasons for Refusal for Japanese Patent Application No. 2022-195315 mailed on May 20, 2026; 14 pp.

* cited by examiner

*Primary Examiner* — Mark S Kaucher
(74) *Attorney, Agent, or Firm* — HAUPTMAN HAM, LLP

(57) ABSTRACT

The present invention relates to a curable resin composition capable of forming a cured product having excellent adhesive strength and easy dismantlability by an oxidizing agent, and capable of imparting excellent dismantlability when used as a primer to pretreat an adherend even when various adhesives, sealants, and coating agents are used. The curable resin composition includes the following components (A) and (B) but free of epoxy resin:

Component (A): A compound having one or more (meth) acryloyl groups per molecule.
   Component (B): A hydrazide compound.

16 Claims, No Drawings

CURABLE RESIN COMPOSITION, A CURED PRODUCT, A LAMINATED BODY COMPOSED OF A CURED PRODUCT, AND A METHOD FOR DISASSEMBLING THEREOF

TECHNICAL FIELD

The present invention relates to a curable resin composition capable of forming a cured product having easy dismantlability, a laminate (laminated body) composed of the cured product, and a method of dismantling the same.

BACKGROUND ART

Adhesives are used to bond two or more different members together, and generally high adhesive strength is required. However, in recent years, from the viewpoint of resource reuse, dismantlable adhesives that can dismantle the bonded interface after use to allow reuse of the members have been needed (Patent Literature 1). Conventional dismantlable adhesives require high temperature heating, or research reports exist but practically used dismantlable adhesives have hardly been confirmed. This is because adhesive strength and dismantlability are in a trade-off relationship, so that it is technically not easy, and in order to impart dismantlability, it is necessary to incorporate a special molecular structure into the raw material of the adhesive, resulting in high manufacturing costs (Patent Literature 2).

CITATION LIST

Patent Literature

[Patent Literature 1] WO 2007/083566
[Patent Literature 2] Japanese Patent Application Publication No. 2012-7036

SUMMARY OF INVENTION

In order to impart dismantlability to an adhesive, it is necessary for the adhesive itself to have dismantlability. It has been necessary to change the physical and chemical structures themselves of various resins conventionally used as adhesives, such as epoxy resins, acrylic resins, and silicone resins, in order to improve dismantlability. However, changing the structures of these resins requires enormous effort.

The present inventors have intensively studied to solve the above problems and found as a result that a curable resin composition capable of forming a cured product having excellent adhesive strength and dismantlability can be provided, and by pretreating an adherend with the curable resin composition as a primer and then applying various adhesives conventionally used, such as epoxy resins, acrylic resins, and modified silicone resins to the adherend, it is possible to impart and improve the dismantlability of conventionally used adhesives, thereby arriving at the present invention.

The gist of the present invention is described below.

[1] A curable resin composition including the following components (A) and (B) but free of epoxy resin:
Component (A): A compound having one or more (meth) acryloyl groups per molecule
Component (B): A hydrazide compound.
[2] The curable resin composition according to [1], wherein the component (A) consists only of (meth) acrylate monomers.

[3] The curable resin composition according to [1] or [2], wherein the component (A) is a difunctional (meth) acrylate and/or trifunctional (meth)acrylate.
[4] The curable resin composition according to [1] or [2], further including: an inorganic filler as a component (C).
[5] The curable resin composition according to [1] or [2], wherein a melting point of the component (B) is 100 to 300° C.
[6] A laminate obtained by applying the curable resin composition according to [1] to one adherend and curing the curable resin composition.
[7] A laminate obtained by applying the curable resin composition according to [1] to one or both of two adherends, bonding the region where the curable resin composition is applied, and then curing the curable resin composition.
[8] A laminate in which at least one of two adherends is the laminate according to [6], and the region where the curable resin composition is applied are bonded with an adhesive and cured.
[9] A laminate wherein the adhesive according to [8] contains at least one composition selected from the group consisting of thermosetting resin compositions, moisture-curing resin compositions, and photocurable resin compositions.
[10] The laminate according to [6], wherein a coating agent is applied and cured on the region where the curable resin composition is applied.
[11] A laminate wherein the coating agent according to contains at least one composition selected from the group consisting of thermosetting resin compositions, moisture-curing resin compositions, and photocurable resin compositions.
[12] A method of dismantling the laminate according to any one of [6] to [11] by immersing the laminate in an aqueous solution containing an oxidizing agent to decompose the cured product of the curable resin composition.

The present invention may also be in the following aspects:
[1]
A curable resin composition including the following components (A) and (B) but free of epoxy resin:
Component (A): A compound having one or more (meth) acryloyl groups per molecule
Component (B): A hydrazide compound.
[2]
The curable resin composition according to [1] above, wherein the component (A) consists only of (meth) acrylate monomers.
[3]
The curable resin composition according to [1] or [2] above, wherein the component (A) is a difunctional (meth)acrylate and/or trifunctional (meth)acrylate.
[4]
The curable resin composition according to any one of [1] to [3] above, further including: an inorganic filler as a component (C).
[5]
The curable resin composition according to any one of [1] to [4] above, wherein a melting point of the component (B) is 100 to 300° C.
[6]
A laminate including: a first adherend; and a layer of cured product of the curable resin composition according to any one of [1] to [5] above formed by applying the curable resin composition to a surface of the first adherend and curing the curable resin composition.

[7]

A laminate obtained by applying the curable resin composition according to any one of [1] to [5] above to one or both of two adherends, bonding the two adherends sandwiching a region where the curable resin composition is applied, and then curing the curable resin composition.

[8]

A laminate according to [6] above, further including: a second adherend, wherein the second adherend is bonded to the first adherend sandwiching a region where an adhesive is further applied to the region where the curable resin composition is applied.

[9]

The laminate according to [8] above, wherein the adhesive contains at least one composition selected from the group consisting of thermosetting resin compositions, moisture-curing resin compositions, and photocurable resin compositions.

[10]

The laminate according to [6] above, wherein a coating agent is further applied to the region where the curable resin composition is applied and the curable resin composition and/or the coating agent is cured.

[11]

The laminate according to [10] above, wherein the coating agent contains at least one composition selected from the group consisting of thermosetting resin compositions, moisture-curing resin compositions, and photocurable resin compositions.

[12]

A method of dismantling a laminate, including: contacting the laminate according to any one of [6] to [11] above with a dismantling agent to decompose the cured product of the curable resin composition in the laminate; and dismantling the laminate from the cured product.

The present invention can provide a curable resin composition capable of exhibiting excellent adhesive strength and easy dismantlability when cured. Furthermore, the present invention is to apply the curable resin composition to an adherend as a primer to pretreat the adherend, and apply conventional adhesives, sealants, coating agents, and the like, that is, to combine the curable resin composition as a primer with conventional adhesives, sealants, coating agents, and the like, thereby making it possible to impart dismantlability to conventional adhesives even in the case of laminates using conventional adhesives and the like. Here, "dismantlability" in the present invention means the property that a cured product of the curable resin composition applied and cured on an adherend can be peeled off from the adherend. In the case where laminated materials are bonded with the cured product in a laminate, it can mean ease of dismantling the laminate (easy dismantlability). Furthermore, "adhesive strength" can be measured by various known adhesive strengths, but means, for example, a shear adhesive strength measured by a tensile shear adhesive strength test method according to JIS K6850: 1999.

DESCRIPTION OF EMBODIMENTS

Details of the present invention are described below. In the present specification, "X to Y" is used to mean numerical values described before and after "to" (X and Y) as the lower limit value and upper limit value, respectively, and means "X or more and Y or less." The preferable embodiments and more preferable embodiments exemplified below can be used in combination as appropriate, regardless of expressions such as "preferable" and "more preferable." The numerical value ranges described are exemplary, and regardless of expressions such as "preferable" and "more preferable," ranges combining the upper and lower limits of each range and numerical values in examples can also be preferably used. Furthermore, terms such as "containing" or "including" may be read as being replaced with "essentially consisting of" or "consisting only of" as appropriate.

<Component (A)>

Component (A) of the present invention is a compound having one or more (meth)acryloyl groups per molecule. In the present specification, a compound having a (meth)acryloyl group refers to a (meth)acrylate. The (meth)acryloyl group may have a (meth)acryloyl group in the form of a (meth)acryloyloxy group. The term "(meth)acryloyl" encompasses both acryloyl and methacryloyl. Therefore, for example, the term "(meth)acryloyl group" encompasses both an acryloyl group ($H_2C$=CH—C(=O)—) and a methacryloyl group ($H_2C$=C(CH$_3$)—C(=O)—). Similarly, the term "(meth)acrylate" encompasses both acrylates and methacrylates, the term "(meth)acryl" encompasses both acryl and methacryl, and the term "(meth)acrylamide" encompasses both acrylamide and methacrylamide.

Examples of the compound having one or more (meth)acryloyl groups per molecule used as component (A) in the present invention include (meth)acrylate oligomers and (meth)acrylate monomers. In the present specification, a (meth)acrylate oligomer refers to a polymer having one or more (meth)acryl groups wherein monomer units (including monomer units other than (meth)acrylate monomers) are repeated, for example, approximately 2 to several tens, preferably approximately 2 to 99, and more preferably approximately 3 to 80, and having a weight average molecular weight (Mw) of, for example, 100 or more, preferably 100 to 1000, more preferably 200 to 800, and further preferably 250 to 600. From the viewpoint of dismantlability by dismantling agents such as oxidizing agents, component (A) preferably contains (meth)acrylate monomers, more preferably consists only of (meth)acrylate monomers, and most preferably consists only of acrylate monomers.

Examples of the (meth)acrylate oligomer include ester (meth)acrylate oligomers having ester bonds in the molecule, ether (meth)acrylate oligomers having ether groups, urethane (meth)acrylate oligomers having urethane bonds, and the like, and backbones thereof include bisphenol A, novolac phenol, polybutadiene, hydrogenated polybutadiene, polyester, polyether, polycarbonate backbone, castor oil backbone, isoprene backbone, hydrogenated isoprene backbone, acrylic polymer, and the like.

Examples of the (meth)acrylate monomers include monofunctional (meth)acrylate monomers and polyfunctional (meth)acrylate monomers, but from the viewpoint of achieving both adhesive strength and dismantlability, component (A) is preferably a polyfunctional (meth)acrylate monomer.

Examples of the monofunctional (meth)acrylate monomers include ethyl (meth)acrylate, n-butyl (meth)acrylate, tert-butyl (meth)acrylate, isobutyl methacrylate, 2-ethyl-hexyl (meth)acrylate, isodecyl (meth)acrylate, butoxydieth-ylene glycol (meth)acrylate, methoxy polyethylene glycol (meth)acrylate, glycidyl (meth)acrylate, lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, benzyl (meth)acrylate, phenyl (meth)acrylate, phenoxyethyl (meth)acrylate, phenoxy diethylene glycol (meth)acrylate, phenoxy tetraethylene glycol (meth)acrylate, nonylphenoxy ethyl (meth)acrylate, butoxyethyl (meth)acrylate, 2-hydroxyethyl (meth)acrylate, 2-hydroxypropyl (meth)acrylate, 4-hydroxybutyl (meth) acrylate, glycerol (meth)acrylate, trifluoroethyl (meth)acrylate, (meth)acryloxyoxyethyl acid phosphate, 2-hydroxyethyl (meth)acrylic acid phosphate, γ-(meth) acryloxypropyltrimethoxysilane, γ-acryloxypropyltrimethoxysilane, morpholinoethyl (meth) acrylate, dimethylaminoethyl (meth)acrylate, diethylaminoethyl (meth)acrylate, N,N-dimethylaminoethyl (meth)acrylate, N,N-dimethylaminopropyl (meth)acrylate, and the like. Monofunctional (meth)acrylates also include monofunctional (meth)acrylates having acidic groups. Examples of monofunctional (meth)acrylates having acidic groups include carboxylic acids and phosphoric acids having (meth) acryloyl groups in the molecule. Examples of carboxylic acids having (meth)acryloyl groups in the molecule include, but are not limited to, (meth)acrylic acid, 3-(meth)acryloyloxypropyl succinic acid, 4-(meth)acryloyloxybutyl succinic acid, 2-(meth)acryloyloxyethyl maleic acid, 3-(meth)acryloyloxypropyl maleic acid, 4-(meth)acryloyloxybutyl maleic acid, 2-(meth)acryloyloxyethyl hexahydrophthalic acid, 3-(meth)acryloyloxypropyl hexahydrophthalic acid, 4-(meth)acryloyloxybutyl hexahydrophthalic acid, 2-(meth) acryloyloxyethyl phthalic acid, 3-(meth)acryloyloxypropyl phthalic acid, 4-(meth)acryloyloxybutyl phthalic acid, and examples of phosphoric acids having (meth)acryloyl groups in the molecule include, but are not limited to, 2-hydroxymethyl (meth)acrylate acid phosphate, 2-hydroxyethyl (meth) acrylate acid phosphate, 2-hydroxypropyl (meth)acrylate acid phosphate. These may be used alone or two or more may be used in combination.

Examples of commercially available products of the monofunctional (meth)acrylate monomers include, but are not limited to, LIGHT ACRYLATE IB-XA (manufactured by Kyoeisha Chemical Co., Ltd.), ACMO (manufactured by KJ Chemicals Corporation), and the like. Examples of commercially available products of (meth)acrylates having phosphoric acid groups include LIGHT ESTER P-1M (manufactured by Kyoeisha Chemical Co., Ltd.), KAYAMER PM-1 (manufactured by Nippon Kayaku Co., Ltd.), and the like. These may be used alone or two or more may be used in combination.

Examples of the polyfunctional (meth)acrylate monomers include triethylene glycol di(meth)acrylate, polyethylene glycol #200 di(meth)acrylate, polyethylene glycol #400 di(meth)acrylate, polyethylene glycol #600 di(meth)acrylate, polyethylene glycol #1000 di(meth)acrylate, tripropylene glycol di(meth)acrylate, polypropylene glycol #400 di(meth)acrylate, polypropylene glycol #700 di(meth)acrylate, polytetramethylene glycol di(meth)acrylate, neopentyl glycol di(meth)acrylate, 3-methyl-1,5-pentanediol di(meth) acrylate, 1,6-hexanediol di(meth)acrylate, 1,9-nonanediol di(meth)acrylate, 1,10-decanediol di(meth)acrylate, dimethylol tricyclodecane di(meth)acrylate, ethylene oxide adduct of bisphenol A di(meth)acrylate, propylene oxide adduct of bisphenol A di(meth)acrylate, neopentyl glycol hydroxypivalate (meth)acrylic acid adduct, 2-hydroxy-3-acryloyloxypropyl methacrylate, 2-hydroxy-3-methacryl-propyl acrylate, trimethylolpropane tri(meth)acrylate, ethoxylated trimethylolpropane tri(meth)acrylate, ethoxylated glycerin tri(meth)acrylate, tris(2-acryloxyethyl) isocyanurate, bis(2-acryloxyethyl) isocyanurate, tris(2-acryloxyethyl) isocyanurate, pentaerythritol tri(meth)acrylate, pentaerythritol tetra (meth)acrylate, ethoxylated pentaerythritol tetra(meth) acrylate, ditrimethylolpropane tetra(meth)acrylate, dipentaerythritol hexa(meth)acrylate, ethoxylated dipentaerythritol poly(meth)acrylate, and the like. These may be used alone or two or more may be used in combination. Among these, from the viewpoint of achieving both adhesive strength and dismantlability, it is preferable to contain at least one compound selected from the group consisting of trimethylolpropane tri(meth)acrylate, dimethylol tricyclodecane di(meth)acrylate, and polyethylene glycol di(meth) acrylate, more preferably contain at least one compound selected from the group consisting of trimethylolpropane triacrylate, dimethylol tricyclodecane diacrylate, and polyethylene glycol diacrylate, and most preferably contain polyethylene glycol diacrylate.

Examples of commercially available products of the polyfunctional (meth)acrylate monomers include, but are not limited to, LIGHT ACRYLATE 9EG-A, LIGHT ACRYLATE 14EG-A, TMP-A, DCP-A (manufactured by Kyoeisha Chemical Co., Ltd.), NK ESTER A-200, A-400, A-600, A-1000, A-DCP, A-TMPT, and the like.

From the viewpoint of achieving both excellent adhesive strength and dismantlability, component (A) preferably contains difunctional and/or trifunctional (meth)acrylate monomers, more preferably contains both difunctional and trifunctional (meth)acrylate monomers, and most preferably only contains difunctional and trifunctional (meth)acrylate monomers. When both difunctional and trifunctional (meth) acrylate monomers are contained, from the viewpoint of achieving both excellent adhesive strength and dismantlability, the molar ratio of difunctional:trifunctional is preferably 9:1 to 1:9, more preferably 5:5 to 1:9, and most preferably 3:7 to 1:9.

<Component (B)>

Component (B) of the present invention is a hydrazide compound. In the present specification, a hydrazide compound refers to a compound having a structure of $H_2NHNC$ (=O)— in the molecule. By curing component (A) using component (B), a cured product that can be easily dismantled by a dismantling agent such as an oxidizing agent can be obtained. Examples of component (B) include acetohydrazide, acetic hydrazide, benzohydrazide, benzoic hydrazide, adipic acid dihydrazide, sebacic acid dihydrazide, dodecanedioic dihydrazide, isophthalic acid dihydrazide, salicylic hydrazide, malonic acid dihydrazide, succinic dihydrazide, and the like, but from the viewpoint of achieving both adhesive strength and dismantlability, it is preferable to be a dihydrazide compound, more preferably a dihydrazide compound having an aromatic ring and/or a repeating unit of $—(CH_2)_n—$ (where n is an integer of 4 to 10) in the molecule, and most preferably a dihydrazide compound having an aromatic ring. These may be used alone or two or more may be used in combination. From the viewpoint of exhibiting curability and high adhesive strength, the melting point of component (B) is preferably 100 to 300° C., more preferably 150 to 280° C., further preferably 180 to 260° C., and most preferably 180 to 220° C. or 200 to 250° C.

Examples of commercially available products of component (B) include, but are not limited to, ADH, SDH, DDH, IDH, SAH (manufactured by Otsuka Chemical Co., Ltd.), and the like.

Component (B) preferably contains 10 to 200 parts by mass with respect to 100 parts by mass of component (A), more preferably 20 to 150 parts by mass, and most preferably 30 to 100 parts by mass. With 10 to 200 parts by mass, a curable resin composition having excellent adhesive strength and dismantlability can be obtained.

In the present invention, it is preferable that component (C), an inorganic filler, is further included. By containing component (C), high adhesive strength can be achieved. Component (C) is preferably a powder, and specific examples of component (C) include minerals such as glass, silica, alumina, mica, ceramics, silicone rubber (powder), calcium carbonate, calcium oxide, aluminum nitride, carbon (powder), kaolin clay, wollastonite, aluminum, and the like. Examples of the shape of component (C) include, but are not limited to, powders, spherical shapes, needle shapes, and the like in addition to powders. These may each be used alone or two or more may be mixed and used. Among component (C), from the viewpoint of improving adhesive strength without decreasing dismantlability, silica, calcium carbonate, and talc are preferable, silica and calcium carbonate are more preferable, and silica, particularly fumed silica is most preferable. When using silica, from the viewpoint of improving dismantlability due to affinity with an oxidizing agent aqueous solution of chloric acid used as a dismantling agent, it is preferable to use a hydrophilic silica, particularly a hydrophilic fumed silica, having many silanol groups remaining on the surface with no surface treatment.

The content of component (C) is preferably 1 to 100 parts by mass, more preferably 2 to 50 parts by mass, and most preferably 3 to 20 parts by mass or 5 to 15 parts by mass with respect to 100 parts by mass of component (A). Being 1 to 100 parts by mass can improve adhesive strength without decreasing dismantlability.

<Optional Components>

The curable resin composition of the present invention may contain additives such as organic fillers, colorants, plasticizers, silane coupling agents, leveling agents, rheology control agents, and the like within a range that does not impair the characteristics of the present invention.

Examples of the organic filler include organic powders composed of rubber, elastomers, plastics, polymers (or copolymers), and the like. Multilayer organic fillers such as core-shell types may also be used. The amount of the organic filler blended is preferably 1 to 50 parts by mass with respect to 100 parts by mass of component (A), more preferably 5 to 30 parts by mass.

Examples of the colorant include, but are not limited to, inorganic pigments such as titanium oxide, ultramarine blue, red iron oxide, lithopone, lead, cadmium, iron, cobalt, aluminum, chlorides, sulfates, and the like; organic pigments such as azo pigments, phthalocyanine pigments, quinacridone pigments, quinacridone quinone pigments, dioxazine pigments, anthrapyrimidine pigments, indanthrone pigments, flavanthrone pigments, perylene pigments, perinone pigments, diketopyrrolopyrrole pigments, quinophthalone pigments, anthraquinone pigments, thioindigo pigments, benzimidazolone pigments, isoindoline pigments, carbon black, and the like. The amount of the colorant blended is preferably 0.01 to 30 parts by mass with respect to 100 parts by mass of component (A).

Examples of the plasticizer include, but are not limited to, dibutyl phthalate, diheptyl phthalate, di(2-ethylhexyl) phthalate, butylbenzyl phthalate, butyl oleate, diethylene glycol dibenzoate, triethylene glycol dibenzoate, pentaerythritol ester, polyethylene glycol, polypropylene glycol, polytetramethylene glycol, and the like. Examples also include polyester-based plasticizers obtained from dibasic acids such as sebacic acid, adipic acid, azelaic acid, and phthalic acid, and dihydric alcohols such as ethylene glycol, diethylene glycol, triethylene glycol, propylene glycol, and dipropylene glycol. These may be used alone or two or more may be used in combination. The amount of the plasticizer blended is preferably 1 to 100 parts by mass with respect to 100 parts by mass of component (A).

Examples of the silane coupling agent include, but are not limited to, vinyl group-containing silane coupling agents such as 3-acryloxypropyltrimethoxysilane, vinyltris(β-methoxyethoxy)silane, vinyltriethoxysilane, and vinyltrimethoxysilane; (meth)acryl group-containing silane coupling agents such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyldipropyloxysilane, 3-acryloxypropylmethyldimethoxysilane, 3-acryloxypropylmethyldiethoxysilane, 3-acryloxypropyldimethylmonopropyloxysilane, 3-acryloxypropyldimethylmonomethoxysilane, 3-acryloxypropyldimethylmonoethoxysilane, and γ-methacryloxypropyltrimethoxysilane; amino group-containing silane coupling agents such as N-β-(aminoethyl)-γ-aminopropyltrimethoxysilane, γ-aminopropyltriethoxysilane, and N-phenyl-γ-aminopropyltrimethoxysilane; γ-mercaptopropyltrimethoxysilane, γ-chloropropyltrimethoxysilane, and the like. These may be used alone or two or more may be used in combination. The amount of the silane coupling agent blended is preferably 0.1 to 20 parts by mass with respect to 100 parts by mass of component (A) of the present invention. With 0.1 to 20 parts by mass, there is no risk of impairing the characteristics of the present invention.

The curable resin composition of the present invention preferably substantially does not contain an epoxy resin. In the present specification, an epoxy resin refers to a compound having one or more glycidyl groups per molecule. This is because if an epoxy resin is contained, the glycidyl group may react with component (B), resulting in a possibility that the cured product may not exhibit dismantlability. The content of the epoxy resin in the curable resin composition of the present invention is, for example, 1% by mass or less, preferably 0.5% by mass or less, more preferably 0.1% by mass or less, and it is further preferable that the content of the epoxy resin is 0% by mass.

<Cured Product>

The curable resin composition of the present invention can be thermally cured under certain conditions to form a cured product. The resulting cured product can be easily decomposed at low temperatures by a dismantling agent such as an oxidizing agent, so that after using the curable resin composition itself as an adhesive, sealant, or coating agent, it can be easily dismantled using the dismantling agent.

The curable resin composition of the present invention forms a cured product having good dismantlability that can be dismantled by thermal curing. Examples of the heating device include, but are not limited to, a hot air drying oven, far infrared heater, hot plate, and the like. From the viewpoint of exhibiting adhesive strength, the heating temperature is preferably 100 to 200° C. The heating time is preferably 0.1 seconds to 5 hours, more preferably 1 second to 3 hours, and most preferably 5 seconds to 2 hours.

<Laminate>

The present invention may be a laminate (laminated body) including a first adherend and a layer of cured product of the curable resin composition described above formed by applying the curable resin composition to a surface of the first adherend and curing the curable resin composition. The coating method, curing method, and the like are as described in the present specification.

The laminate may also include a second adherend. When including a second adherend, the second adherend can be bonded to the first adherend sandwiching a region where an adhesive is further applied to the region where the curable resin composition is applied. After bonding the first and second adherends together, the curable resin composition and/or the adhesive can be cured to obtain a laminate in which the adhesion between the first and second adherends is enhanced. The curing of the curable resin composition and/or adhesive may be performed by first curing the curable resin composition to form a cured product, then applying an adhesive onto the surface of the cured product, applying the second adherend onto the adhesive, and curing the adhesive, or by applying the curable resin composition and adhesive and then simultaneously curing the curable resin composition and adhesive.

Furthermore, the laminate may be one in which a coating agent is further applied to the region where the curable resin composition is applied and then the curable resin composition and/or the coating agent is cured. When the layer of adhesive is present in the laminate, it is appropriate for the coating agent to exist between the layer of cured product of the curable resin composition and the layer of adhesive. Here, the coating agent may be at least one composition selected from the group consisting of thermosetting resin compositions, moisture-curing resin compositions, and photocurable resin compositions.

As another embodiment, the present invention may also be a laminate obtained by applying the curable resin composition described above to one or both of two adherends, bonding the two adherends sandwiching a region where the curable resin composition is applied, and then curing the curable resin composition. The application of the curable resin composition may be over the entire adherend or only a part thereof, but the two adherends are in principle bonded via the region where the curable resin composition is applied. By curing the curable resin composition after bonding the two adherends, a laminate of at least three layers including one adherend, cured product of the curable resin composition, and the other adherend can be obtained.

Here, the adhesive may be at least one composition selected from the group consisting of thermosetting resin compositions, moisture-curing resin compositions, and photocurable resin compositions.

<Uses (Adhesive, Sealant, Coating Agent)>

When using the curable resin composition of the present invention itself as an adhesive or sealant, a laminate having dismantlability can be obtained by applying it to one or both of two adherends, bonding the region where the curable resin composition is applied, and then curing the curable resin composition.

When using the curable resin composition of the present invention itself as a coating agent, a laminate having dismantlability can be obtained by applying it to an adherend and curing the curable resin composition.

The curable resin composition of the present invention can be applied to an adherend using the same method as known methods for applying adhesives and sealants. For example, dispensing using an automatic coating machine, spraying, inkjet printing, screen printing, gravure printing, dip coating, spin coating, brush coating, and the like can be used. The curable resin composition of the present invention is preferably liquid at 25° C. from the viewpoint of coatability.

Specific examples of the thermosetting, photocurable adhesives, sealants, and coating agents include curable vinyl polymers, curable polyethers, curable polyesters, curable polyurethanes, curable polyureas, curable fluoropolymers, curable polyorganosiloxanes, curable epoxies, and the like.

The adhesives, sealants, and coating agents contain a compound having one or more functional groups of various types according to the curing form. For example, compounds having functional groups such as (meth)acryloyl groups, allyl groups, hydrosilyl groups, glycidyl groups, hydrolyzable silyl groups, silanol groups, mercapto groups, amino groups, isocyanate groups, hydroxy groups, cyanate groups, acid anhydride groups, phenol groups, isocyanurate groups, and the like can be given. In particular, from the viewpoint of excellent adhesive strength to adherends and substrates, those having two or more functional groups are preferable, and it is preferable to contain compounds having (meth)acryloyl groups, allyl groups, glycidyl groups, hydrolyzable silyl groups, and isocyanate groups, more preferable to contain compounds having (meth)acryloyl groups, glycidyl groups, and hydrolyzable silyl groups.

Examples of the hydrolyzable silyl group include alkoxy groups such as methoxy groups, ethoxy groups, propoxy groups, butoxy groups, methoxyethoxy groups, and ethoxyethoxy groups; acyloxy groups such as acetoxy groups, propionyloxy groups, butylcarbonyloxy groups, and benzoyloxy groups; alkenyloxy groups such as isopropenyloxy groups, isobutenyloxy groups, and 1-ethyl-2-methylvinyloxy groups; ketoxime groups such as dimethylketoxime groups, methylethylketoxime groups, diethyl ketoxime groups, cyclopentanoxime groups, and cyclohexanoxime groups; amino groups such as N-methylamino groups, N-ethylamino groups, N-propylamino groups, N-butylamino groups, N,N-dimethylamino groups, N,N-diethylamino groups, and N-cyclohexylamino groups; amide groups such as N-methylacetamide groups, N-ethylacetamide groups, and N-methylbenzamide groups; aminooxy groups such as N,N-dimethylaminooxy and N,N-diethylaminooxy groups.

The curable resin composition of the present invention used as the adhesive, sealant, and coating agent may contain crosslinking agents, catalysts, curing agents, colorants, fillers, flame retardants, diluents, plasticizers, antioxidants, defoamers, coupling agents, leveling agents, rheology control agents, and the like within a range that does not impair the characteristics of the present invention.

<Use (Primer)>

The curable resin composition of the present invention can impart dismantlability to laminates using not only the adhesive, sealant, and coating agent of the curable resin composition but also adhesives, sealants, and coating agents other than the curable resin composition by pretreating an adherend as a primer. In the present specification, a primer refers to a material used for surface treatment of an adherend before applying an adhesive, sealant, or coating agent. It should be noted that the curable resin composition of the present invention has the advantage of not being affected by the curing form of an adhesive, sealant, and coating agent when used as a primer. Curing forms of the adhesive, sealant, and coating agent include, for example, moisture-curing, anaerobic curing, heat curing, photocuring, two-component mixing curing, solvent evaporation curing, and various other curing forms, but can be suitably used for moisture-curing, heat-curing, and photocurable adhesives, sealants, and coating agents. When using the curable resin composition of the present invention as a primer, it is preferable that 50% or more of the dismantle surface area of the member to be dismantled is pretreated, more preferable that 70% or more thereof is pretreated, and most preferable that 100% thereof is pretreated.

When using the curable resin composition of the present invention as a primer and then applying an adhesive or sealant of the present invention or those conventionally used, a laminate having dismantlability can be obtained. As a method of using the curable resin composition of the present invention as a primer, specifically, the curable resin composition is coated on one or both of two adherends and thermally cured. Thereafter, an adhesive or sealant is further coated on the surface of one or both of the adherends on which the curable resin composition has been coated and cured as a primer, and the coated adhesive or sealant is cured under certain conditions, thereby obtaining a laminate having dismantlability. When the curable resin composition is treated as a primer on only one of the two adherends, the uncured adhesive or sealant needs only to be in contact with the primer-treated surface, and the adhesive or sealant may be coated on and cured on the adherend on which the curable resin composition is coated for bonding, or may be coated on and contacted with the uncoated adherend.

When using the curable resin composition of the present invention as a primer and then applying a coating agent of the present invention or those conventionally used, a laminate having dismantlability can be obtained. As a method of using the curable resin composition of the present invention as a primer, specifically, the curable resin composition is coated on one adherend, cured under certain conditions, a coating agent is coated on the region where the curable resin composition is applied, and the coating agent is cured under certain conditions, thereby obtaining a laminate having dismantlability.

Known methods can be used to apply the adhesive, sealant, and coating agent to the adherend or substrate after pretreating with the curable resin composition of the present invention as a primer. For example, dispensing using an automatic coating machine, spraying, inkjet printing, screen printing, gravure printing, dip coating, spin coating, and the like can be used. The adhesive, sealant, and coating agent of the present invention are preferably liquid at 25° C. from the viewpoint of coatability.

<Curing Method and Dismantling Method>

The method of curing the adhesive, sealant, and coating agent can be set to certain conditions according to the curing form of the adhesive, sealant, and coating agent. For example, in the case of thermosetting, it is preferable to cure at 50° C. to 300° C., further preferably 70° C. to 200° C. In the case of thermal curing, the curing time is preferably 0.1 to 200 minutes, further preferably 1 to 100 minutes. In the case of photocuring, the light source is not particularly limited, and low pressure mercury lamps, medium pressure mercury lamps, high pressure mercury lamps, ultra-high pressure mercury lamps, blacklight lamps, microwave-excited mercury lamps, metal halide lamps, sodium lamps, halogen lamps, xenon lamps, LEDs, fluorescent lamps, sunlight, electron beam irradiation devices, and the like can be used. The irradiation amount is preferably 5 to 50 kJ/m², further preferably 7 to 40 kJ/m². In the case of moisture curing, it is preferable to cure at 10 to 50° C., and the humidity is preferably 30 to 80%. In the case of moisture curing, the curing time is preferably 1 day to 2 weeks, more preferably 3 days to 1 week.

The laminate using the curable resin composition of the present invention can be dismantled by a method including contacting the laminate with a dismantling agent containing an oxidizing agent, etc. to decompose the cured product of the curable resin composition in the laminate, and dismantling the laminate from the cured product. The laminate using the curable resin composition of the present invention can be dismantled by contacting a dismantling agent such as an oxidizing agent under certain conditions. From the viewpoint of safety, the preferred dismantling temperature in the present invention is 5 to 70° C., more preferably 10 to 60° C., and most preferably 20 to 50° C. The contact time required with the dismantling agent such as an oxidizing agent for dismantling is not particularly limited, but is preferably 10 seconds to 24 hours, more preferably 1 minute to 24 hours, and most preferably 30 minutes to 20 hours. Here, the dismantling agent is preferably in the form of an aqueous solution containing an oxidizing agent, etc., and it is more preferable to immerse the laminate to be dismantled in the aqueous solution.

<Dismantling Agent>

Various oxidizing agents can be used as dismantling agents for peeling off the cured product of the cured curable resin composition of the present invention from an adherend. Examples of the oxidizing agent include chlorine, bromine, hydrogen peroxide solution, or hypochlorous acid or salts thereof, but hypochlorites are preferable from the viewpoint of versatility, and sodium hypochlorite is more preferable. The dismantling agent is preferably used as an aqueous solution. For example, it is preferable to use an aqueous solution of sodium hypochlorite.

<Adherend>

The type of adherend to which the curable resin composition of the present invention can be applied is not particularly limited, and metals, plastics, rubbers, and the like can be given. Examples of metals include iron, aluminum, stainless steel (SUS), nickel, zinc, magnesium, gold, silver, copper, titanium, and the like. Examples of plastics include fiber reinforced plastics (FRP), glass fiber reinforced plastics (GFRP), carbon fiber reinforced plastics (CFRP), polyacryl, polyester, polyamide, acrylonitrile-butadiene-styrene copolymer (ABS), nylon 6, nylon 6/6, polycarbonate, polyacetal, polyethylene terephthalate, polybutylene terephthalate (PBT), polyphenylene sulfide, polyphenylene ether, polyether ether ketone, polyethylene, polypropylene, and the like. Examples of rubbers include nitrile rubber, urethane rubber, silicone rubber, EPDM, and the like. Among these, metals are generally easy to exhibit adhesive strength and are normally difficult to dismantle, but are preferable since they can be easily dismantled by using the curable resin composition of the present invention.

<Other Uses>

The curable resin composition of the present invention can be used alone and can be combined with various adhesives, sealants, coating agents, and the like composed of epoxy resins, acrylic resins, modified silicone resins, etc. that are not dependent on the curing form, so that it can be applied to a wide variety of uses. Specific examples of applicable uses include bonding, sealing, casting, coating, etc. of automotive switches, headlamps, engine internal parts, electrical parts, drive engines, brake oil tanks, front hoods, fenders, body panels such as doors, windows, etc.; in electronic materials, bonding, sealing, casting, coating, etc. of flat panel displays (liquid crystal displays, organic EL displays, light-emitting diode displays, field emission displays), video disks, CDs, DVDs, MDs, pickup lenses, hard disks, etc.; in batteries, bonding, sealing, coating, etc. of lithium batteries, lithium ion batteries, manganese batteries, alkaline batteries, fuel cells, silicon-based solar cells, dye-sensitized solar cells, organic solar cells, etc.; in optical components, bonding, sealing, coating, etc. of optical fiber materials around optical switches and optical connectors, optical passive components, optical circuit components, and optical electronic integrated circuits; in optical equipment, bonding, sealing, coating, etc. of camera modules, lens materials, viewfinder prisms, target prisms, viewfinder covers, light-receiving sensors, capture lenses, and projection lenses for projection television; in infrastructure, it can be used for bonding, lining materials, sealing, coating materials, etc. of gas pipes, water pipes, and the like.

EXAMPLES

The present invention will be described below in more detail by Examples, but the present invention is not limited only to these Examples.

Examples 1-12, Comparative Examples 1-3

The following components were prepared to create curable resin compositions.

(A-1) Trimethylolpropane triacrylate—Product name: A-TMPT (manufactured by Shin-Nakamura Chemical Co., Ltd.); Weight average molecular weight: 296.32

(A-2) Dimethylol tricyclodecane diacrylate—Product name: LIGHT ACRYLATE DCP-A (manufactured by Kyoeisha Chemical Co., Ltd.); Weight average molecular weight: 304.39

(A-3) Polyethylene glycol #400 diacrylate (polyethylene glycol diacrylate)—Product name: LIGHT ACRYLATE 9EG-A (manufactured by Kyoeisha Chemical Co., Ltd.); Number of repeating ethylene oxide units: 9; Weight average molecular weight: approximately 540 tions of Examples 1-6 were coated on aluminum plates (A1050P) with a width of 25 mm×length of 100 mm×thickness of 1 mm using a spacer so that the overlap surface was 25 mm×10 mm and the coating thickness was 0.1 mm. An aluminum plate on which the curable resin composition was not coated was bonded. The resulting test piece was heated at 170° C. for 1 hour in a hot air drying oven, returned to room temperature (25° C.), and used as a shear adhesive strength test piece. The shear adhesive strength test piece was measured for maximum strength (MPa) using a tensile tester at 50 mm/min, and this was taken as the shear adhesive strength (initial).

[Shear Adhesive Strength (after Immersion)]

A shear adhesive strength test piece was prepared in the same manner as the initial one, and the test piece was immersed in a 500 ml beaker containing 400 mL of a 6% aqueous solution of sodium hypochlorite (Kitchen Hyter, manufactured by Kao Corporation) and immersed at 50° C. for 16 hours in a thermostatic bath. The immersed test piece was taken out of the beaker and allowed to stand for 12 hours in a draft under an atmosphere of 25° C. and 55% RH to dry the test piece. The dried test piece was measured for maximum strength (MPa) using a tensile tester at a tensile rate of 50 mm/min, and this was taken as the shear adhesive strength (after immersion).

[Shear Adhesive Strength (Rate of Change)]

$$\text{Rate of change} = (\text{Shear adhesive strength of test piece after immersion} - \text{Shear adhesive strength of test piece before immersion})/\text{Shear adhesive strength of test piece before immersion} \times 100(\%)$$

In the present invention, a decrease in strength of −40% or more is considered passing, and −50% or more decrease in strength is particularly preferred.

TABLE 1

|  |  |  | Example 1 | Example 2 | Example 3 | Example 4 | Example 5 | Example 6 |
|---|---|---|---|---|---|---|---|---|
| A-1 | A-TMPT |  | 16 | 27 | 43 | 16 | 100 | 24 |
| A-2 | DCP-A |  |  |  |  |  |  | 76 |
| A-3 | 9EG-A |  | 84 | 73 | 57 | 84 |  |  |
| B-1 | IDH |  | 47 | 54 | 63 |  | 98 | 72 |
| B-2 | ADH |  |  |  |  | 42 |  |  |
| C | AEROSIL 200 |  | 9 | 11 | 13 | 9 |  |  |
| Trifunctional:Difunctional Molar Ratio |  |  | 1:2 | 1:1 | 2:1 | 1:2 | — | 1:2 |
| Shear adhesive strength AL/AL | Initial | MPa | 7.16 | 10.5 | 12.6 | 2.6 | 9.8 | 11.9 |
|  | After immersion |  | 0 | 0 | 0 | 0 | 4.3 | 6.48 |
| Change Rate |  | % | −100% | −100% | −1009% | −100% | −56% | −46% |

(B-1) Isophthalic acid dihydrazide—Product name: IDH (manufactured by Otsuka Chemical Co., Ltd.); Melting point: 220° C.

(B-2) Adipic acid dihydrazide—Product name: ADH (manufactured by Otsuka Chemical Co., Ltd.); Melting point: 180° C.

(C) Hydrophilic fumed silica—Surface treatment: Unprocessed (residual silanol groups); Product name: AEROSIL 200 (manufactured by Nippon Aerosil Co., Ltd.)

The component (A) was weighed into a stirring container, and the component (B) and component (C) were added to this stirring container and stirred with a mixer for 30 minutes. Specific preparation amounts were according to Table 1, and all values are expressed in parts by mass. All tests were performed at 25° C.

[Shear Adhesive Strength (Initial)]

The shear adhesive strength was measured according to JIS K6850: 1999. Specifically, the curable resin composi- As shown in Table 1, the curable resin compositions of Examples 1-6 containing (A) and (B) showed good adhesive strength, but a significant decrease in strength was confirmed after immersion in the oxidizing agent. In particular, dismantling of the test pieces occurred in the beaker during immersion for Examples 1-4, and dismantling of the shear adhesion test pieces was possible without applying force.

Furthermore, in order to confirm the effect of imparting dismantlability when using the curable resin composition as a primer, each adhesive was prepared. The following components were weighed and stirred with a mixer to obtain the following three adhesives.

Thermosetting adhesive: Composition containing bisphenol A epoxy resin at 100 parts by mass, dicyandiamide at 8 parts by mass, and urea curing agent at 4 parts Moisture-curing adhesive: Composition containing polyoxyalkylene polymer having hydrolyzable silyl groups at both ends at 100 parts by mass, and tin catalyst at 3 parts by mass Photocurable adhesive: Composition containing urethane diacrylate at 50 parts by mass, isobornyl acrylate at 50 parts by mass, and photo radical initiator at 4 parts by mass

[Preparation of Shear Adhesive Strength Test Piece]

The following adherends were used for the shear adhesive strength measurement. The adherend combinations are described in Table 2.

Aluminum plate (A1050P) (AL): Width 25 mm×length 100 mm×thickness 1 mm

Rate of change=(Shear adhesive strength of test piece after immersion−Shear adhesive strength of test piece before immersion)/Shear adhesive strength of test piece before immersion×100(%).

In the present invention, a decrease in strength of −40% or more is considered passing, and −50% or more decrease in strength is particularly preferred.

TABLE 2

| | | | Example 7 | Example 8 | Example 9 | Example 10 | Example 11 | Example 12 | Comparative Example 1 | Comparative Example 2 | Comparative Example 3 |
|---|---|---|---|---|---|---|---|---|---|---|---|
| Curable Resin Composition | | | Example 1 | Example 2 | Example 3 | Example 4 | Example 1 | Example 1 | None | None | None |
| Adhesive | | | Thermo-setting | Thermo-setting | Thermo-setting | Thermo-setting | Moisture-curing | Photo-curable | Thermo-setting | Moisture-curing | Photo-curable |
| Shear Adhesive Strength Change Rate | AL/AL | % | −85% | −73% | −53% | −90% | −100% | Un-measured | −1% | −15% | Un-measured |
| | Glass/Glass | | −62% | Un-measured | Un-measured | Un-measured | −100% | −100% | 0% | −9% | −5% |
| | AL/Acrylic | | Un-measured | Un-measured | Un-measured | Un-measured | Un-measured | −100% | Un-measured | Un-measured | −22% |

Glass plate (glass): Width 25 mm×length 100 mm×thickness 5 mm

Acrylic plate (acrylic): Width 25 mm×length 100 mm×thickness 2 mm

The curable resin compositions of Examples 1-4 were coated on aluminum or glass plate test pieces using a spacer so that the coating thickness was 0.1 mm. They were heated at 170° C. for 1 hour in a hot air drying oven, and returned to room temperature (25° C.) to obtain test pieces pretreated with the curable resin composition. The adhesive was coated on the other test piece which was not pretreated, and the other test piece was bonded so that the overlap surface with the pretreated test piece was 25 mm×10 mm. They were cured under the following conditions for each adhesive to obtain shear adhesive strength test pieces.

In the case of using thermosetting adhesive: Hot air drying oven; 150° C.×1 hour In the case of using moisture-curing adhesive: Thermo-static chamber; 25° C.×55% RH×1 week In the case of using photocurable adhesive: Mercury lamp belt conveyor type, integrated light exposure of 30 kJ/m²

Since the photocurable adhesive does not cure unless light can transmit through, an adherend using a transparent acrylic resin was used instead of the aluminum plate, and ultraviolet irradiation was performed from the acrylic resin plate side to cure it.

[Shear Adhesive Strength (Rate of Change)]

The shear adhesive strength test pieces prepared with the combinations of adherends were immersed in 500 mL beakers containing 400 mL of a 6% aqueous solution of sodium hypochlorite (Kitchen Hyter, manufactured by Kao Corporation) and immersed at 50° C. for 16 hours in a thermostatic bath. The immersed test pieces were taken out of the beaker, allowed to stand for 12 hours in a draft under an atmosphere of 25° C. and 55% RH to dry the test pieces, and these were used as the immersed test pieces.

The test pieces before and after immersion were measured for maximum strength (MPa) using a tensile tester at a tensile rate of 50 mm/min.

From Table 2, in Examples 7-12 using test pieces pre-treated with the curable resin composition of the present invention, it was confirmed that immersion in an aqueous solution of sodium hypochlorite caused a significant decrease in strength regardless of the type of adhesive. On the other hand, it was confirmed that Comparative Examples 1-3 using test pieces not pretreated with the curable resin composition showed almost no decrease in strength. Also, when the state of the fracture surfaces of the test pieces after the adhesive strength test in Examples 7-12 was observed, peeling had occurred from the surface where the curable resin composition was applied. From the above, it can be seen that the decrease in shear adhesive strength of the test pieces after immersion is due to the curable resin composition, and by pretreating adherends with the curable resin composition combining components (A) and (B), dismant-lability can be imparted regardless of the type of adhesive or adherend.

INDUSTRIAL APPLICABILITY

The curable resin composition of the present invention can form a cured product capable of being easily decom-posed by a dismantling agent such as an oxidizing agent while having excellent adhesive strength, and can impart dismantlability when using various adhesives, sealants, and coating agents by pretreating adherends as a primer, so that it is extremely useful industrially.

The invention claimed is:

1. A curable resin composition comprising the following components (A) to (C) but free of epoxy resin:

Component (A): Polyethylene glycol diacrylate;

Component (B): A hydrazide compound; and

Component (C): An inorganic filler;

wherein a melting point of the component (B) is 150 to 280° C., and wherein the content of the component (C) is 1 to 100 parts by mass with respect to 100 parts by mass of the component (A).

2. The curable resin composition according to claim 1, wherein the component (A) consists only of (meth)acrylate monomers.

3. The curable resin composition according to claim 1, wherein the component (B) is selected from the group consisting of adipic acid dihydrazide, sebacic acid dihydrazide, dodecanedioic dihydrazide, isophthalic acid dihydrazide, malonic acid dihydrazide, and succinic dihydrazide.

4. The curable resin composition according to claim 1, wherein the component (C) is selected from the group consisting of glass, silica, alumina, mica, ceramics, silicone rubber (powder), calcium carbonate, calcium oxide, aluminum nitride, carbon (powder), kaolin clay, wollastonite, and aluminum.

5. A laminate comprising: a first adherend; and a layer of cured product formed by applying the curable resin composition according to claim 1 to a surface of the first adherend and curing the curable resin composition.

6. A laminate obtained by applying the curable resin composition according to claim 1 to one or both of two adherends, bonding the two adherends sandwiching a region where the curable resin composition is applied, and then curing the curable resin composition.

7. A laminate according to claim 5, further comprising: a second adherend, wherein the second adherend is bonded to the first adherend sandwiching a region where an adhesive is further applied to the region where the curable resin composition is applied.

8. The laminate according to claim 7, wherein the adhesive contains at least one composition selected from the group consisting of thermosetting resin compositions, moisture-curing resin compositions, and photocurable resin compositions.

9. The laminate according to claim 5, wherein a coating agent is further applied to the region where the curable resin composition is applied and the curable resin composition and/or the coating agent is cured.

10. The laminate according to claim 9, wherein the coating agent contains at least one composition selected from the group consisting of thermosetting resin compositions, moisture-curing resin compositions, and photocurable resin compositions.

11. A method of dismantling a laminate, comprising: contacting the laminate according to claim 5 with a dismantling agent to decompose the cured product of the curable resin composition in the laminate; and dismantling the laminate from the cured product.

12. The method according to claim 11, wherein the dismantling agent is an oxidizing agent.

13. The method according to claim 11, wherein the dismantling agent is hypochlorite.

14. A method for preparing a curable resin composition comprising the following components (A) to (C) but free of epoxy resin:

Component (A): Polyethylene glycol diacrylate;

Component (B): A hydrazide compound; and

Component (C): An inorganic filler;

wherein a melting point of the component (B) is 150 to 280° C., and wherein the content of the component (C) is 1 to 100 parts by mass with respect to 100 parts by mass of the component (A).

15. The curable resin composition according to claim 1, wherein the component (C) is a hydrophilic silica.

16. The curable resin composition according to claim 1, wherein the melting point of component (B) is 200 to 250° C.

* * * * *